United States Patent [19]

Kajiwara

[11] Patent Number: 5,557,323
[45] Date of Patent: Sep. 17, 1996

[54] DISTANCE MEASURING APPARATUS

[75] Inventor: Yasuya Kajiwara, Himeji, Japan

[73] Assignee: Mitsubishi Denki Kabushiki Kaisha, Tokyo, Japan

[21] Appl. No.: 354,483

[22] Filed: Dec. 12, 1994

[30] Foreign Application Priority Data

Dec. 14, 1993 [JP] Japan .................................. 5-313562

[51] Int. Cl.⁶ ...................................................... H04N 7/18
[52] U.S. Cl. ............................ 348/140; 348/170; 382/103
[58] Field of Search ....................................... 348/116, 113, 348/140, 169, 170, 171, 172, 135, 142; 382/240, 270, 274, 106, 177, 205, 283, 282, 173, 291

[56] References Cited

U.S. PATENT DOCUMENTS

| | | | |
|---|---|---|---|
| 4,944,023 | 7/1990 | Imao et al. ........................... | 382/240 |
| 5,008,748 | 4/1991 | Carr et al. ........................... | 348/417 |
| 5,381,173 | 1/1995 | Asayama ............................. | 348/169 |

FOREIGN PATENT DOCUMENTS

| | | |
|---|---|---|
| 0529619 | 3/1993 | European Pat. Off. . |
| 4006989 | 9/1990 | Germany . |

OTHER PUBLICATIONS

ITEJ Technical Report, vol. 12, No. 24, pp. 1–6, Jun. 1988.

Primary Examiner—Tommy P. Chin
Assistant Examiner—A. Au
Attorney, Agent, or Firm—Sughrue, Mion, Zinn, Macpeak & Seas

[57] ABSTRACT

A distance measuring apparatus sets a plurality of sub-windows in a picture plane so that the size of each sub-window having a contrast higher than a predetermined value is as small as possible but is greater than a minimum size. Therefore, it is possible to recognize the shape of an object and to measure a distance thereto with high resolution and high precision. For high speed processing, the sub-windows are successively updated in a predetermined cycle in such a manner that only those sub-windows which exist in a region in which a deviation of an image of the object last sensed relative to a previous image thereof is greater than a pre-scribed value are updated.

4 Claims, 10 Drawing Sheets

(a) t=t0

(b) t=t0 +△t t=t0 t=t0 +△t (a)

IMAGE IN
UPPER CAMERA (b)

IMAGE IN
LOWER CAMERA

IMAGE IN UPPER CAMERA

IMAGE IN LOWER CAMERA

IMAGE IN UPPER CAMERA

IMAGE IN LOWER CAMERA

DISTANCE MEASURING APPARATUS

BACKGROUND OF THE INVENTION

1. Field of the Invention

The present invention relates to an apparatus for measuring a distance to an object by processing an image picked up by a stereo camera.

2. Description of the Related Art

A well-known type of distance measuring apparatus measures a distance to an object by splitting a picture plane into small squares and finding the parallax of each of the squares in stereovision as disclosed in, for example, "Measurement of Distance between Cars in Stereovision Using Matching for Each Region", Institute of Television Engineering Technical Report, Jun. 24, 1988.

Furthermore, Japanese Patent Application Laid-Open No. 2-232512 discloses an apparatus which sets a single wide window and successively updates the setting of the window to track an object in the window.

FIG. 6 explains the principle of measuring a distance R through triangulation by using a pair of optical systems comprising a pair of lenses 1 and 11 with a focal length f and a pair of image sensors 2 and 12. The optical axes of the lenses 1 and 11 are set apart from each other by a base length L, and the image sensors 2 and 12 are respectively located at a distance of the focal length of from the lenses 1 and 11. When it is assumed that an amount of displacement between a first image of an object in a first picture plane picked up by the upper image sensor 2 and a second image of the object in a second picture plane picked up by the lower image sensor 12 is represented by a+b, the distance R is given by the following expression:

$$R = f \cdot L/(a+b)$$

In such a distance measuring apparatus, image signals are passed through A/D converters 3 and 13 and stored in memories 4, 5 and 14, and distance calculations are carried out by a calculating unit in the form of a computer 6.

Specifically, a displacement between the first and second images of the object is detected by enclosing the first image with a window and comparing the first image in the window with the second image in the second picture plane, as shown in FIG. 7.

Assuming that the position of the window is expressed in pixel positions in the upper image sensor, the window is formed from a matrix of pixels with m rows and n columns which starts with a point in i-th row and j-th column and ends with a point in (i+m)-th row and (j+n)-th column.

When it is assumed that an image signal level at a point (u, v) in the first picture plane is $S^1 u, v$ and that an image signal level at a point (u, v) in the second plane is $S2u,v$, an image in the first picture plane most matching with an image in the second picture plane is found from a hatched area in the second plane according to the following expression.

$$S(q) = \Sigma \Sigma |S^1 u, v - S^2 u, v+q-|$$

where q is a variable; v is a value ranging from j to j+n; and u is a value ranging from i to i+m.

FIG. 8 is a graph showing the value of S(q) when the value q is changed in the above expression. In this graph, a value $q_o$ which gives the minimum value of S(q) corresponds to an amount of displacement of the first image relative to the second image.

Assuming that the pixel pitch is P, the distance R to the object is determined as follows.

$$R = f \cdot L/P \cdot q_o$$

FIG. 9 shows another conventional distance measuring apparatus for performing distance measurement by using a plurality of sub-windows which are formed by splitting a picture plane into a plurality of squares of equal size.

Let us assume that the horizontally x-th and vertically y-th square is represented by (x, y) and the distance to an object in the square is represented by R(x, y). In this case, R(x, y) can be determined in the same manner as above.

In other words, when each square is formed from a matrix with m rows and n columns, the square (x, y) corresponds to a window starting with a point in m(x−1)-th row and n(y−1)-th column and ending with a point in mx-th row and ny-th column. Therefore, the distance R(x, y) to an object in each square can be found in the same manner as mentioned in the above prior art.

Since the distances to respective parts of the object can be found in this method, the outline of the object can be determined based on data on R(x, y).

In the above-described conventional distance measuring apparatus in which the size of a sub-window is fixed, if the area of each sub-window is so wide as to allow objects other than a target object to come into the wide sub-window, a target object such as a preceding car will often be difficult to recognize and an exact distance to the target object cannot be measured.

On the other hand, if each sub-window is so small that an image of a target object in the sub-window may occupy the entire area of the sub-window (i.e., the area of the target image is equal to or greater than that of the sub-window), there will be no valid contrast in the respective portions of the sub-window and therefore the recognition of the object will be difficult, thus making it impossible to measure the distance to the target object. Furthermore, in this case, the number of effective data contained in such a small sub-window is so limited that the distance measurement, if possible, can be subject to the adverse influence of noise, thus inducing large errors in the measurement.

SUMMARY OF THE INVENTION

It is an object of the present invention to provide a distance measuring apparatus which is capable of recognizing the shape of an object without causing any substantial errors in distance measurement.

In order to achieve the above object, according to the present invention, there is provided a distance measuring apparatus comprising:

- image pick-up means for optically picking up an object at two different points to form a first and a second image;
- window setting means for forming a window containing the first image and for successively splitting the window into a plurality of sub-windows in a repeated manner so that a contrast of each sub-window last split exceeds a predetermined value but the contrast thereof upon the next splitting becomes less than the predetermined value; and
- distance calculation means for calculating a distance to the object through the principle of triangulation based on a deviation of the first and second images.

In a preferred form of the invention, the window setting means ceases splitting of the sub-windows when a size of each sub-window last split becomes less than a prescribed value.

In another preferred form of the invention, the window setting means finds a deviation of an image of the object last pick up by the image pick-up means relative to a previous image thereof, and updates only those sub-windows which exist inside a region in which the deviation is greater than a prescribed value.

In a further preferred form of the invention, the window setting means finds a deviation of an image of the object last pick up by the image pick-up means relative to a previous image thereof, and updates only those sub-windows which exist inside a region in which the deviation is greater than a prescribed value, and wherein the distance measuring means performs distance measurements only for those sub-windows which exist inside the region.

In the distance measuring apparatus of the present invention as defined above, since a plurality of sub-windows are set so that each sub-window has a contrast value higher than a predetermined one, it is possible to determine the outline of a target object for exact identification thereof as well as to measure the distance to the object in a precise manner.

Furthermore, when the entire window is successively updated in a predetermined cycle, only a part of sub-windows existing in a region in which the present contrast of each sub-window has substantially varied from the previous one are updated or refreshed, the window setting or updating procedure can be successively carried out in a short time so that high-speed tracking of the object can be achieved.

DESCRIPTION OF THE PREFERRED EMBODIMENTS

Preferred embodiments of the present invention will now be described with reference to the accompanying drawings.
Embodiment 1

Figure 1:
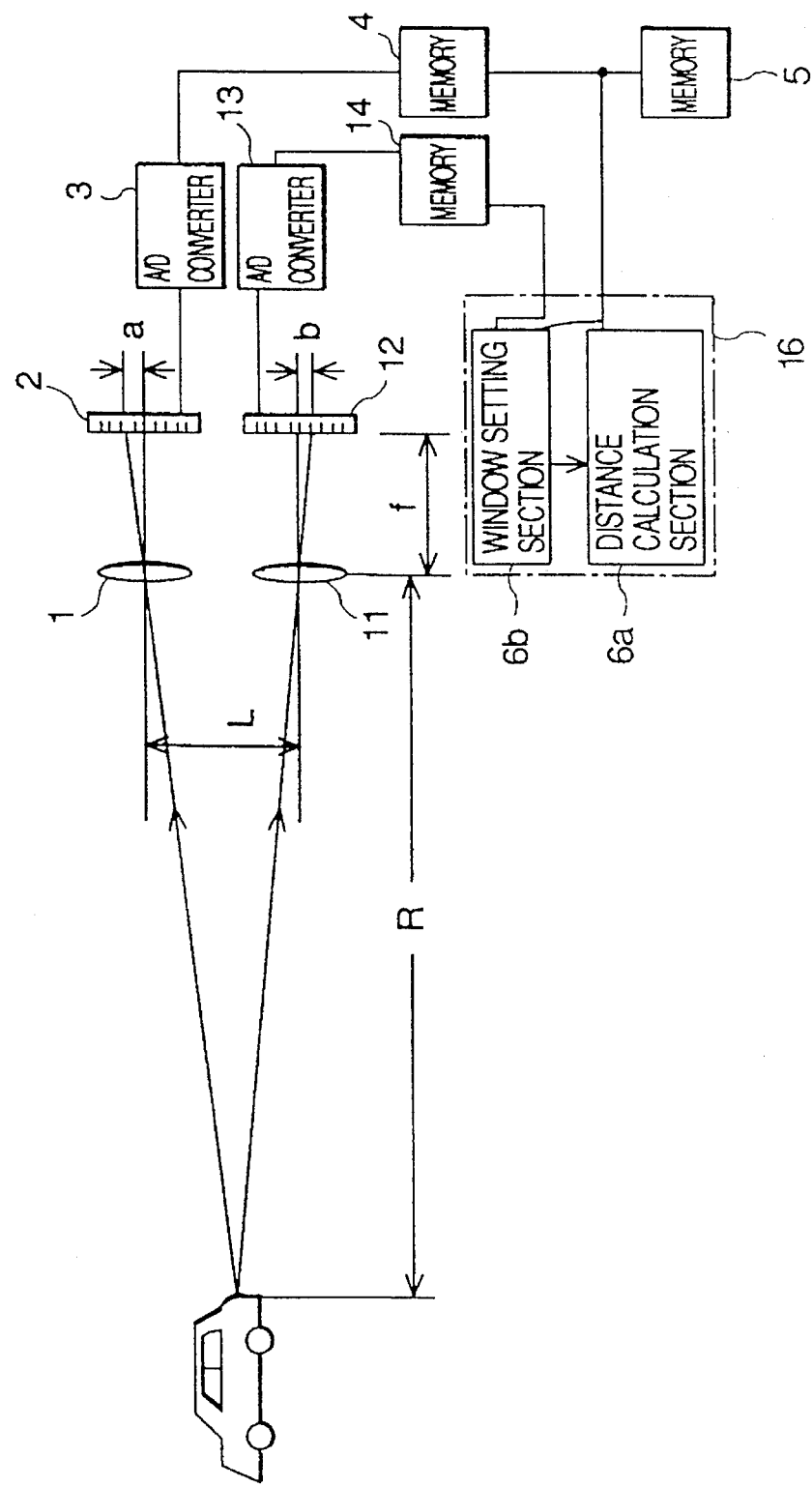
FIG. 1 is a block diagram showing a first embodiment of the present invention.

FIG. 1 is a block diagram showing the general structure of a distance measuring apparatus according to a first embodiment of the present invention. The distance measuring apparatus of this embodiment is substantially similar to the above-mentioned conventional apparatus except for the construction and operation of a calculating unit. The calculating unit in the form of a computer 16 functionally includes a distance calculating section 6a and a window setting section 6b. The principle of distance calculations by the distance calculating section 6a is the same as in the above prior art described with reference to FIGS. 6 through 9. In particular, the present invention is featured in a window setting process which is performed by the window setting section 6b of the computer 16 in the following manner.

Figure 2:
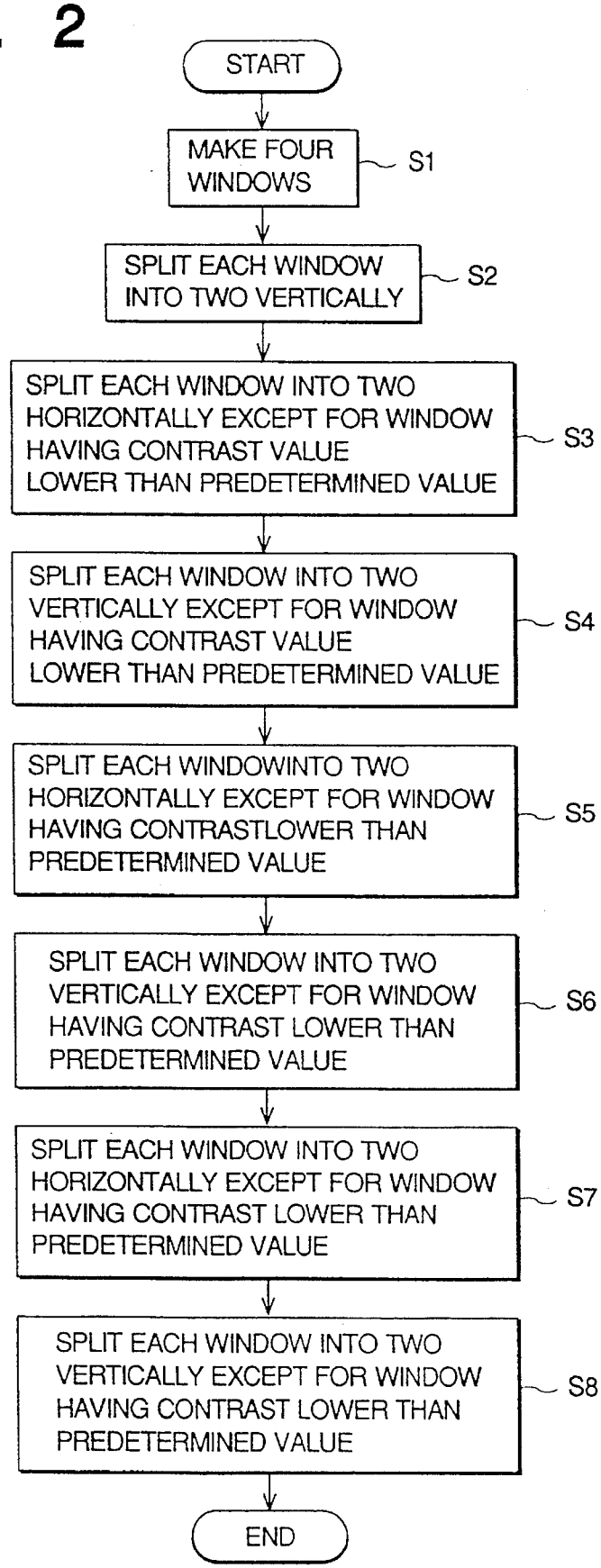
FIG. 2 is a flowchart showing a window setting procedure in the first embodiment.
Figure 3:
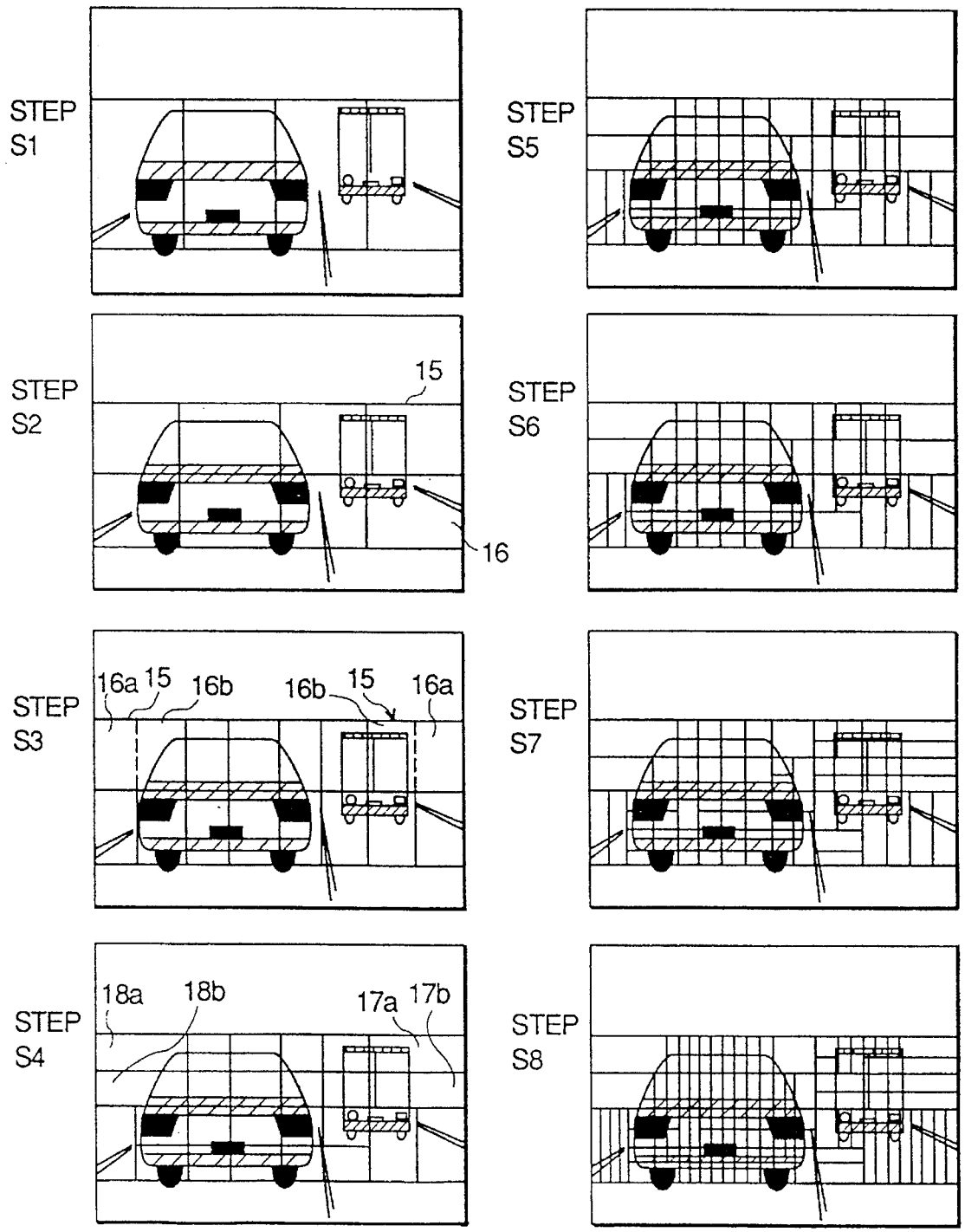
FIG. 3 is a view showing the window setting procedure in a picture plane in the first embodiment.

FIG. 2 is a flowchart showing the window setting process, and FIG. 3 explains the process by using a picture plane. Referring to these figures, for example, four relatively wide windows are first formed on a picture plane such as a display screen in Step S1. However, it is clear that in the present invention, the number of windows is not limited to four, but may be any. The number of windows is so set that a contrast value of each window exceeds a predetermined value. Here, it should be noted that the contrast of a window is defined as a ratio of a brightness of the brightest point (pixel) to that of the darkest point (pixel) inside the window or as a ratio of a brightness of the brightest point inside the window to an average brightness of the window.

Subsequently, in Step S2, each window is horizontally split into two sub-windows 15, 16 to reduce the size of each window by half for example. Here, let us assume that the contrast of each of the sub-windows 15, 16 thus split is higher than the predetermined value.

In this case, in Step S3, each of the sub-windows 15, 16 is vertically split into two sub-windows 16a, 16b so that its size is reduced by half. If, however, the contrast value of a sub-window 16a thus formed is less than the predetermined value, further vertical splitting for such a sub-window of a insufficient contrast is ceased and the last splitting thereof is cancelled (See Step S4).

More specifically, for example, if a sub-window 15 is vertically split or divided into two sub-windows 16a, 16b in Step S3 as shown in dotted lines, and if at least one of such sub-windows 16a, 16b has no valid contrast (i.e., the contrast of the at least one sub-window 16a is lower than the predetermined value), further vertical splitting for such sub-windows 16a, 16b are ceased.

Subsequently, in Step S4, each of sub-window 15, 16a, 16b having contrast values greater than the predetermined value is vertically split into two sub-windows 17a, 17b or 18a, 18b, thereby further reducing the size of each sub-window by half. At this time, if at least one of sub-windows thus formed has a contrast value lower than the predetermined value, no further vertical splitting is made as in Step S3. If, however, the sub-windows 15 and 16 shown in Step S3 after being vertically spit have valid contrasts (i.e., the contrast of each of these sub-windows is greater than the predetermined value), they are further split into sub-windows.

Subsequently, similar splitting is repeated in subsequent steps until the contrast value of each of the finally split sub-windows becomes lower than the predetermined value. Although only eight steps up to Step S8 are shown in FIG. 3, the number of steps may be larger than eight. As the number of sub-windows increases, the size of each sub-window decreases. However, it is preferable as described below that the minimum sub-window be formed of several tens of pixels.

Here, it is to be noted that too small and too many sub-windows merely result in an accordingly extended calculation or processing time without contributing to any improved recognition of the shape of the object.

When the following equation is calculated with too small number of pixels contained in each sub-window, a change of a function S(q) relative to a change of a variable q is limited due to small values of m and n so that the resolution or accuracy of the distance obtained from $S(q_o)$ is accordingly reduced. Furthermore, errors in distance calculations are liable to take place under the influence of noise.

$$S(q)=\Sigma\Sigma|S^1u,v-S^2u,v+q|$$

where u=i to i+m and v=j to j+n.

As described above, since each sub-window finally obtained has a contrast higher than a predetermined value and the size of the window is so set as to contain at least several tens of pixels, it is possible to recognize the shape of an object and to measure the distance to the object with high precision and high resolution.

Embodiment 2

Figure 4:
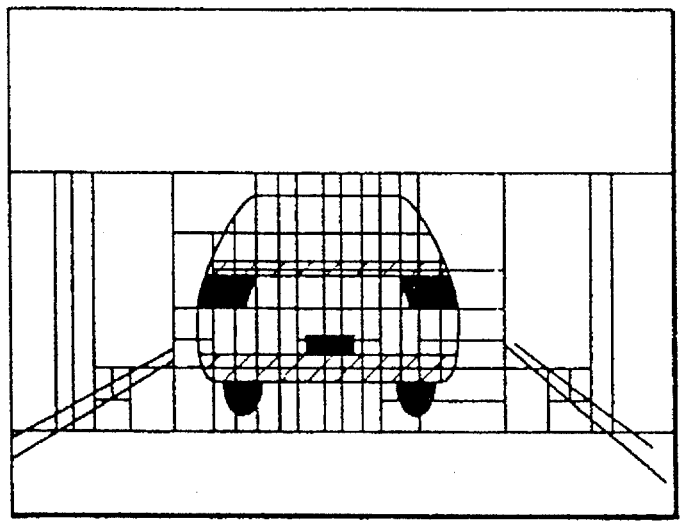
FIG. 4 is a view showing a procedure for setting a window in time series according to a second embodiment of the present invention.
Figure 4:
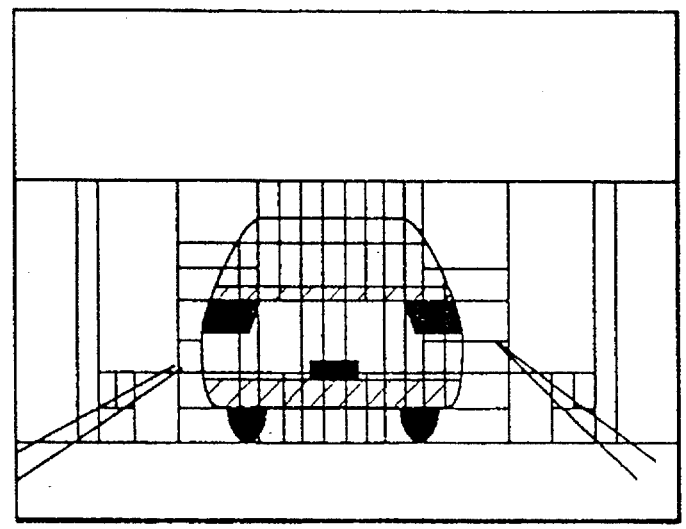
Figure 4A:
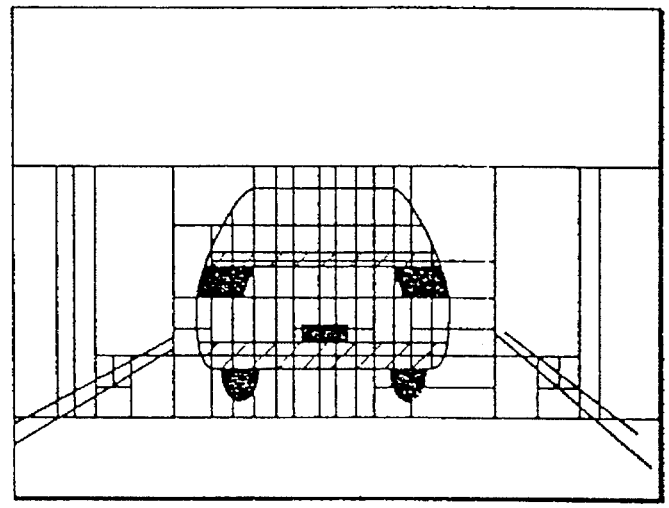
Figure 4B:
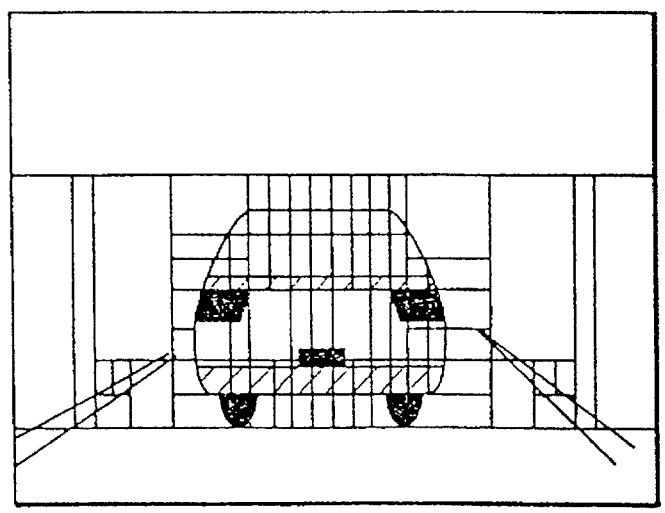
Figure 5:
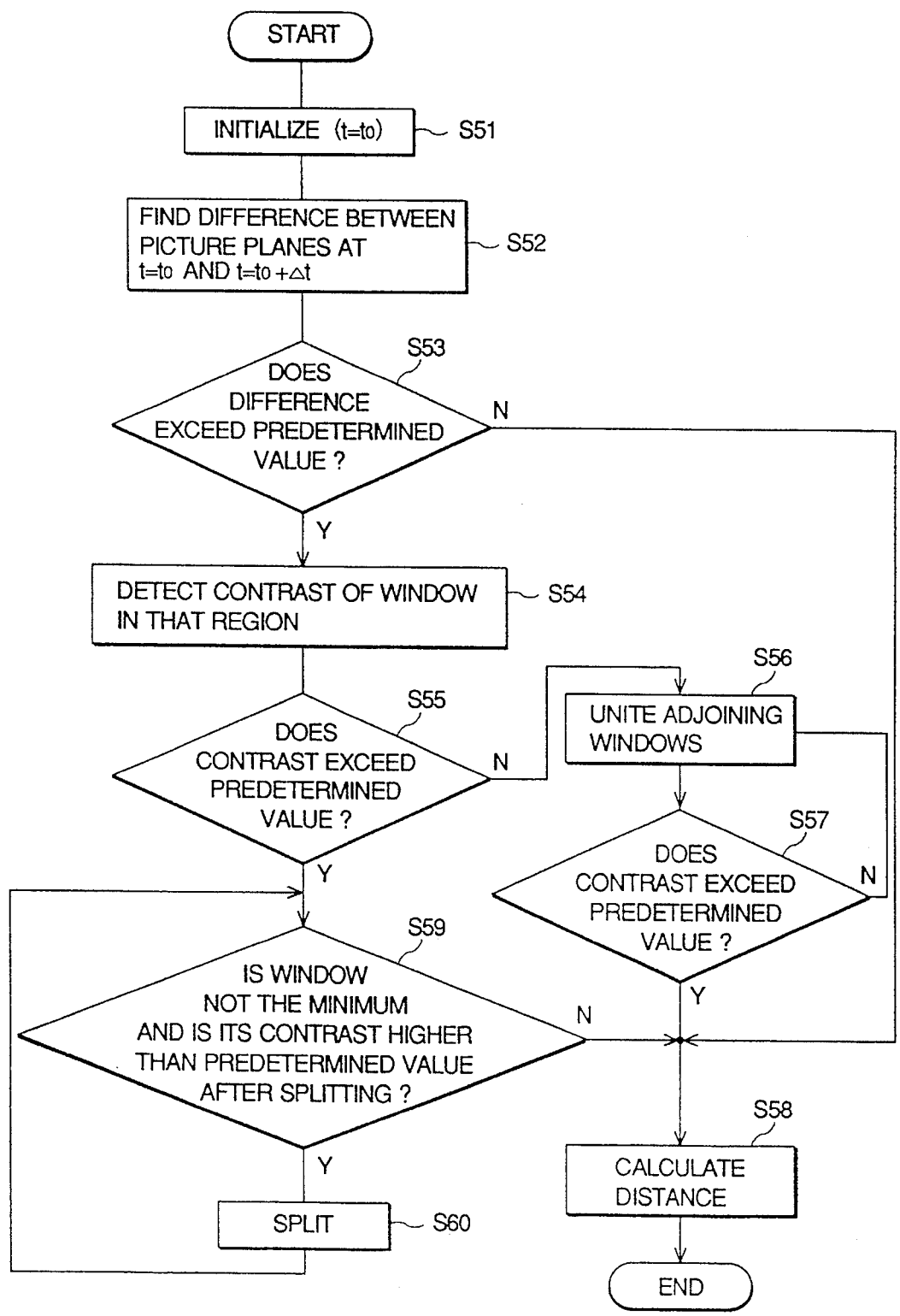
FIG. 5 is a flowchart showing the procedure for setting a window in time series in the second embodiment.
Figure 6:
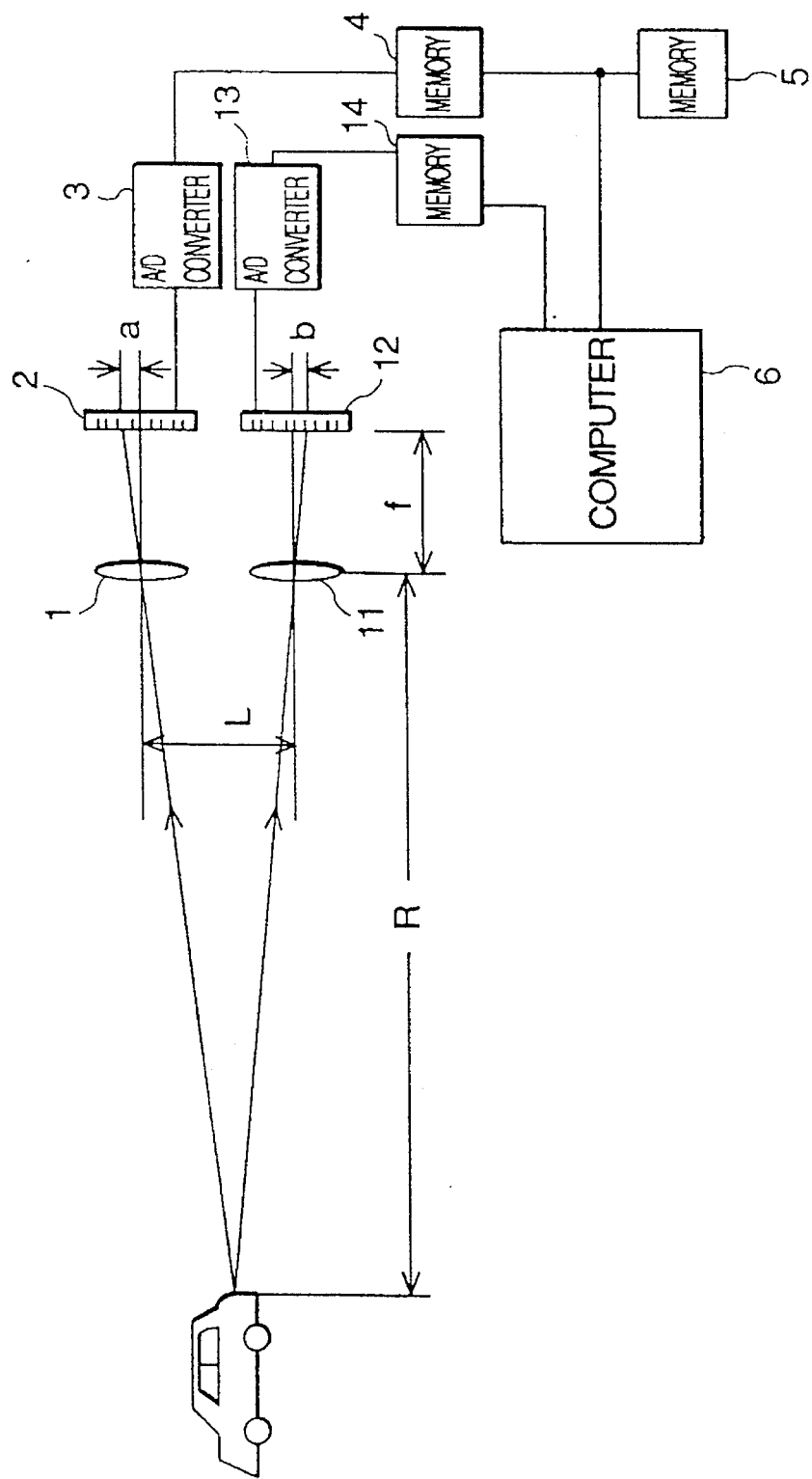
FIG. 6 is a block diagram of a conventional distance measuring apparatus.
Figure 7:
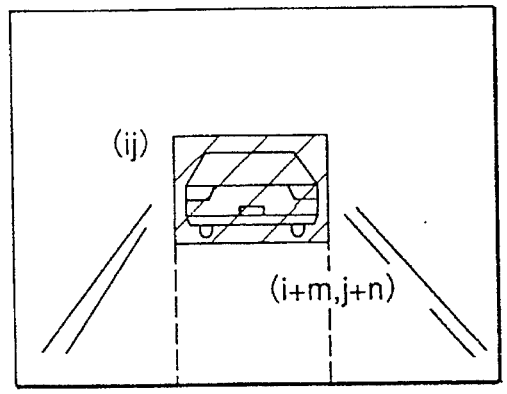
FIG. 7 is a view showing the operation of the conventional distance measuring apparatus.
Figure 7:
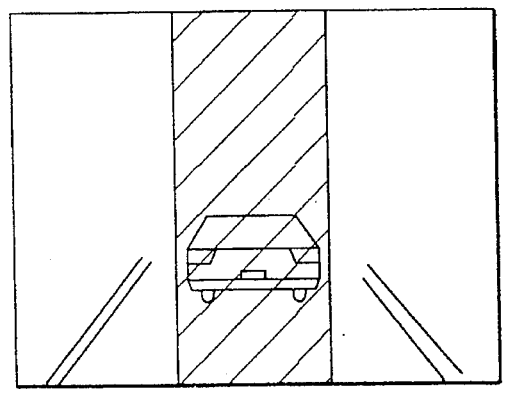
Figure 8:
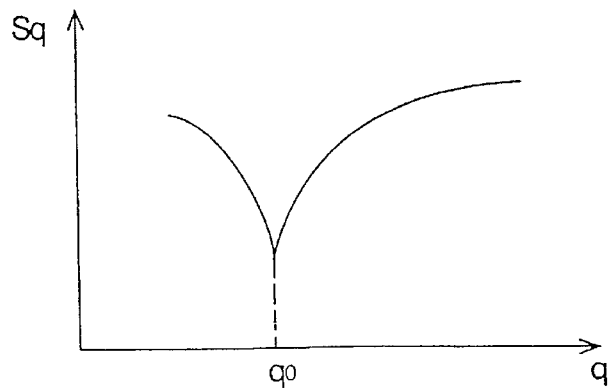
FIG. 8 is a view showing a method of calculating a distance to an object.
Figure 7A:
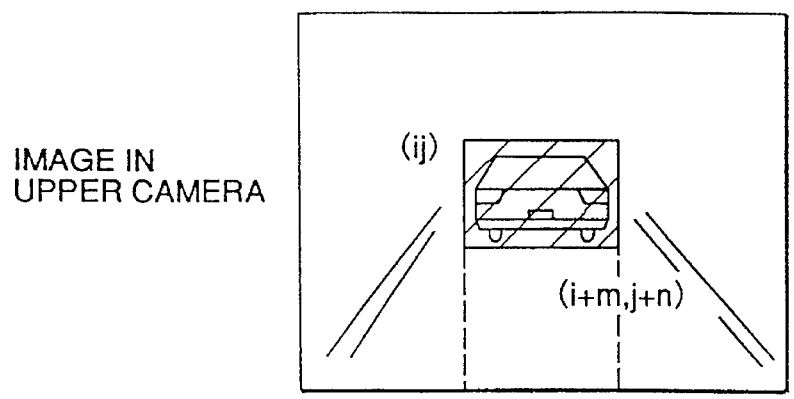
Figure 7B:
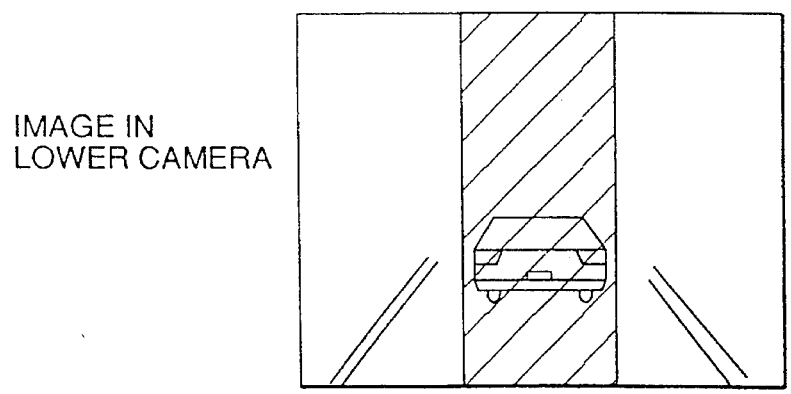
Figure 8:
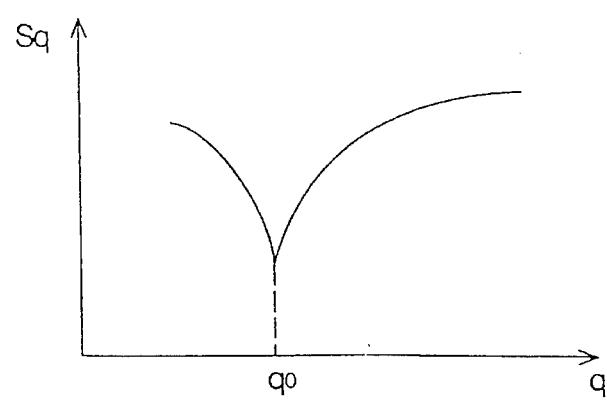
Figure 9A:
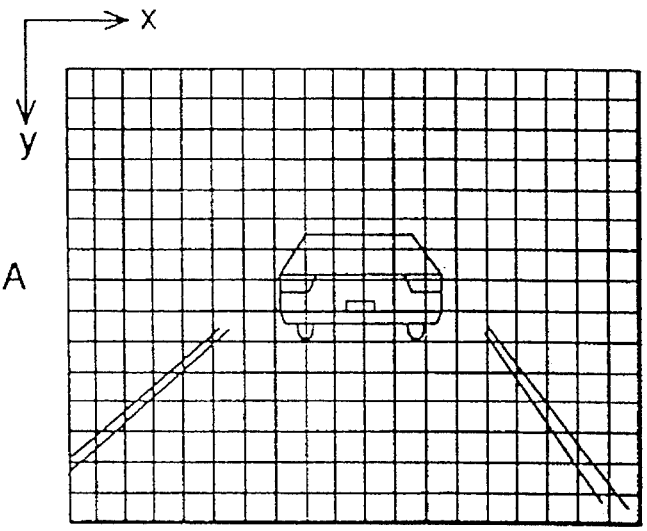
FIG. 9 is a view explaining a conventional distance measuring method using a window split into a plurality of sub-windows each having a fixed size.
Figure 9B:
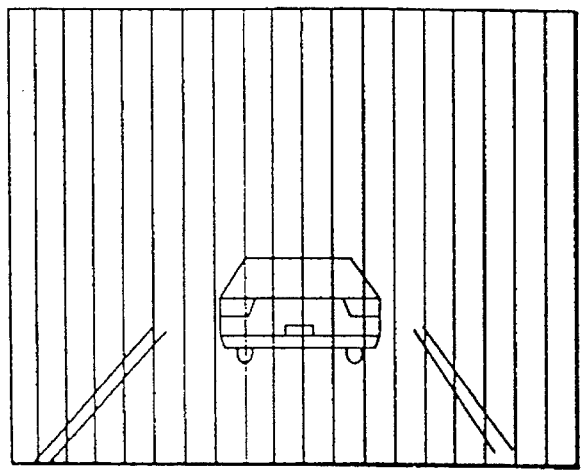

FIGS. 4 and 5 show a second embodiment of the invention in which a moving object in the form a preceding vehicle is successively tracked. FIG. 4 is a view showing split regions in a picture plane, and FIG. 5 is a flowchart showing a window setting process of the second embodiment.

In Step S51, the apparatus is initialized to form an appropriate number of subwindows for an image of a target object picked up by the camera at time $t=t_o$ in the same manner as in the first embodiment.

At time $t=t_o+\Delta t$ after the lapse of a short time $\Delta t$ from time $t_o$, the image of the moving object picked up by the camera has moved or changed in its position in a first picture window as the object and the camera are moving relative to each other. It is considered that an amount of change or movement of the object relative to the camera is limited when the time $\Delta t$ is small. Therefore, it seems that if all the subwindows are renewed or updated at time $t=t_o+\Delta t$ in the same procedure as in the first embodiment, an extended time will be required for updating all the sub-windows and this is merely wasteful because the thus updated sub-windows are very close or similar to those set at time $t=t_o$.

Therefore, it is preferable to find, at time $t=t_o+\Delta t$, a difference or deviation of the object image sensed at time $t=t_o+\Delta t$ from that sensed at time t=to (Step S52) and to determine whether the size of each sub-window in a region in which the deviation exceeds a prescribed value is appropriate.

Specifically, for example, the contrast of each sub-window existing in a region in which the deviation exceeds the prescribed value is detected (Step S53, Step S54). If the contrast does not exceed the predetermined value, a previous window comprising a combination of now split two sub-windows is used. That is, the size of each sub-window inside the above region is enlarged twofold for example (Step S55, Step S56). If the contrast of the enlarged sub-window still does not exceed the predetermined value, a further previous sub-window comprising a combination of two previously split sub-windows inside the above region is used (Step S57, Step S56). In this manner, the size of each sub-window is enlarged stepwise.

To the contrary, if the contrast of a sub-window in a region in which the deviation is greater than the prescribed value exceeds the predetermined value, and if the sub-window is greater than the predetermined minimum size, splitting is repeated as many times as possible until the contrast of a sub-window thus split becomes equal to or less than the predetermined value. In this manner, the size of sub-windows inside the above region is successively reduced to an appropriate minimal level (Step S59, Step S60).

Thereafter, the distance to an object in each sub-window is carried out in Step S58, and only the sub-windows inside the above region are updated in a predetermined cycle, i.e., at $t=t_o+2\Delta t$, $t=t_o+3\Delta t$ and so on. Thus, the time required to update the sub-windows can be shortened, and the object can be easily tracked. In this regard, in Step S58, distance measurements may be carried out only for the sub-windows inside the above region but not for those outside it so that the time required for distance measurements can be accordingly reduced.

The apparatus of this embodiment as described above is suitable for measuring the distance between cars, tracking a preceding car, and detecting a car which is coming in between cars.

What is claimed is:

1. A distance measuring apparatus comprising:

image pick-up means for optically picking up an object at two different points to form a first and a second image;

window setting means for forming a window containing said first image and for successively splitting said window into a plurality of sub-windows in a repeated manner so that a contrast of each sub-window last split exceeds a predetermined value but the contrast thereof upon the next splitting becomes less than said predetermined value; and distance calculation means for calculating a distance to said object through the principle of triangulation based on a deviation of said first and second images.

2. A distance measuring apparatus according to claim 1, wherein said window setting means ceases the splitting of said sub-windows when a size of each sub-window last split becomes less than a prescribed value.

3. A distance measuring apparatus according to claim 1, wherein said window setting means finds a deviation of an image of said object last pick up by said image pick-up means relative to a previous image thereof, and updates only those sub-windows which exist inside a region in which the deviation is greater than a prescribed value.

4. A distance measuring apparatus according to claim 2, wherein said window setting means finds a deviation of an image of said object last pick up by said image pick-up means relative to a previous image thereof, and updates only those sub-windows which exist inside a region in which the deviation is greater than a prescribed value.

* * * * *